United States Patent [19]

Farr

[11] 4,066,005
[45] Jan. 3, 1978

[54] SERVO-MOTORS FOR VEHICLE BRAKING SYSTEMS

[75] Inventor: Glyn Phillip Reginald Farr, Kenilworth, England

[73] Assignee: Girling Limited, Birmingham, England

[21] Appl. No.: 597,909

[22] Filed: July 21, 1975

[51] Int. Cl.² .......................... F15B 9/10; F01B 19/00; F16J 3/02
[52] U.S. Cl. ........................................ 91/369 B; 92/99
[58] Field of Search ............... 91/369 B, 369 A, 369 R

[56] References Cited

U.S. PATENT DOCUMENTS

| 2,900,963 | 8/1959 | Ayers, Jr. | 91/369 B |
|---|---|---|---|
| 2,949,892 | 8/1960 | Ayers, Jr. | 91/369 B |
| 2,989,033 | 6/1961 | Stelzer | 91/369 B |
| 3,013,535 | 12/1961 | Schultz | 91/369 B |
| 3,037,486 | 6/1962 | Taylor | 91/369 B |
| 3,183,789 | 5/1965 | Stelzer | 91/369 B |
| 3,385,167 | 5/1968 | Wilson et al. | 91/369 B |
| 3,387,540 | 6/1968 | Wilson | 91/369 B |
| 3,845,692 | 11/1975 | Takeuchi | 91/369 B |
| 3,906,836 | 9/1975 | Wilson | 91/369 B |

Primary Examiner—Paul E. Maslousky
Attorney, Agent, or Firm—Scrivener, Parker, Scrivener & Clarke

[57] ABSTRACT

In a fluid-pressure operated servo-motor in which an output force applied to an output member is augmented by differential pressures applied to opposite faces of a movable wall, a one-piece reaction plate of corrugated outline is interposed between the input and output members and the movable wall. In use the reaction plate transmits a load from the movable wall to the output member and transmits a reactive proportion of the output load back to the input member.

1 Claim, 4 Drawing Figures

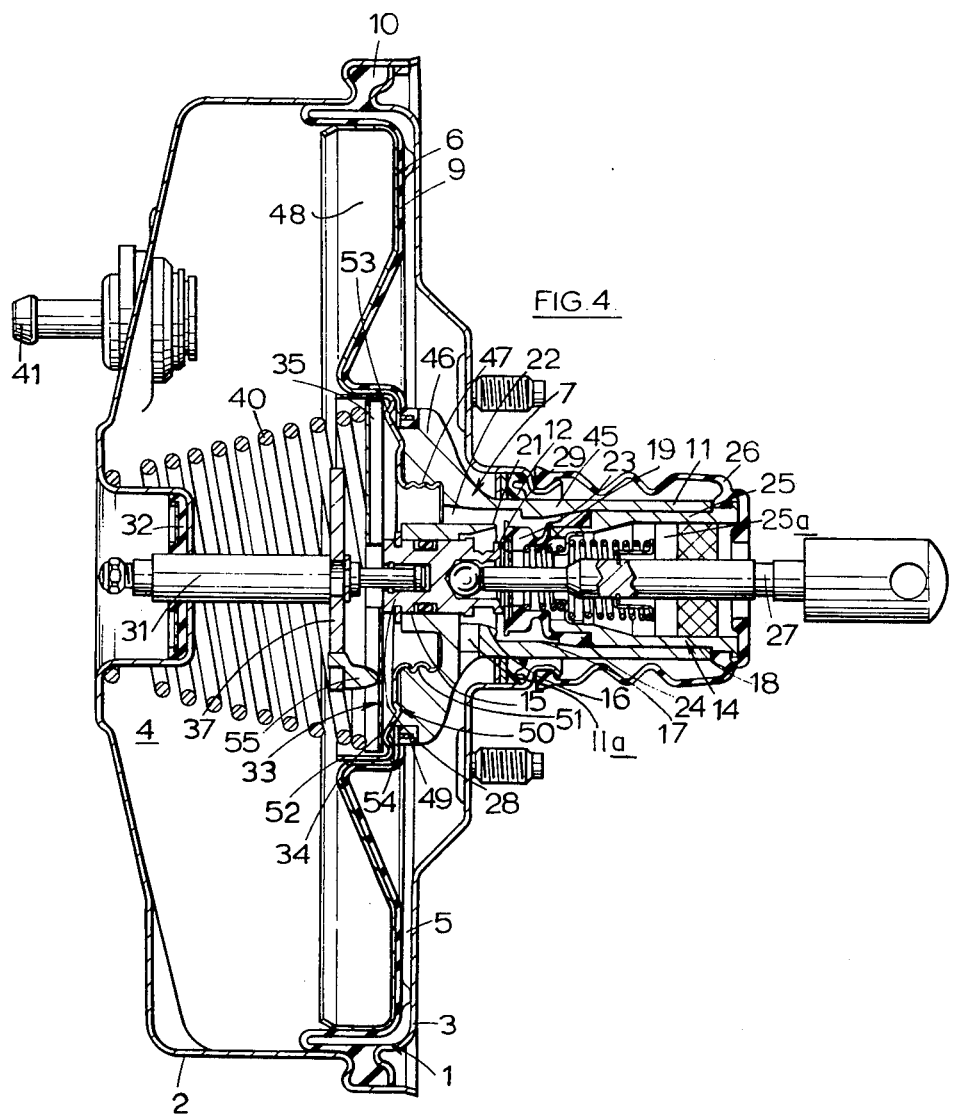

SERVO-MOTORS FOR VEHICLE BRAKING SYSTEMS

SPECIFIC DESCRIPTION

This invention relates to improvements in fluid-pressure operated servo-motors of the kind in which an output force applied to a force output member is augmented by differential pressures applied to opposite sides of a movable wall located in a housing, and the application to opposite sides of the wall of the differential pressures is controlled by valve means operable in response to an input force applied to an input member, a reactive proportion of the output force being transmitted back from the output member to the input member through reaction means to provide a reaction or "feel" for the operator to enable the operation of the servo-motor to be more readily controlled.

In known servo-motors of the kind set forth the reaction means comprises a deformable or flowable material, for example a block of resilient material or hydraulic fluid. Since the properties of such material are influenced by temperature changes, the operational characteristics of the servo-motors may change, thereby altering the efficiency of a brake adapted to be actuated by the servo-motor. To overcome this problem, in another construction, the reaction means comprises a disc assembly consisting of a relatively stiff flat metal sheet having a central opening which is radially slotted from the opening to its outer periphery into a plurality of segments which are bonded together by an elastic layer applied to one face of the sheet so that the segments act as individual levers acting between the movable wall and the output member, and between the output member and the input member to provide the reaction or "feel". Restoring and return forces are provided by the resistence of the elastic layer.

According to our invention in a fluid-pressure operated servo-motor of the kind set forth the reaction means comprises a single component in the form of a one-piece annular reaction plate of corrugated outline which, in use, is adapted to flex to transmit a load from the movable wall to the output member and to transmit the reactive proportion of the output load back to the input member.

This simplifies the construction and obviates the necessity of providing a plurality of separate levers interconnected by a second member or part and the necessary flexibility and strength is provided in a single component. Also the servo-motor is substantially unaffected by temperature changes.

Preferably the annular reactive plate acts on the movable wall at its outer peripheral edge, acts on the input member at its inner peripheral edge, and acts on the output member at an intermediate point in its radial length.

By constructing the reaction plate of corrugated outline provides sufficient flexibility while maintaining adequate rigidity to withstand the operational forces.

In one form the corrugations are symmetrically arranged, are of segmental outline and comprise radial fingers interconnected by radial integral webs.

In one construction the movable wall includes an axially movable servo piston of substantial diameter of which the face adjacent to the output member is provided with a series of forwardly directed angularly spaced projections located within adjacent depressions in the plate to define a fulcrum for the outer end of the plate. Similarly the output member is provided with a corresponding series of rearwardly directed spaced projections which are located within adjacent depressions on opposite sides of the plate to define a fulcrum for the plate at the intermediate point in its radial length.

In another construction the servo piston has a single annular projection engaging with adjacent faces of the fingers to form a fulcrum for the outer end of the reaction plate, and the output member is provided with at least one projection for engagement with the opposite face of at least one of the fingers with which the annular projection engages, the reaction plate also providing an abutment for one end of a return spring for the movable wall.

Two embodiments of our invention are illustrated in the accompanying drawings in which:

FIG. 4 is a longitudinal section similar to FIG. 1 at a modified fluid-pressure operated servo-motor.

Figure 1:
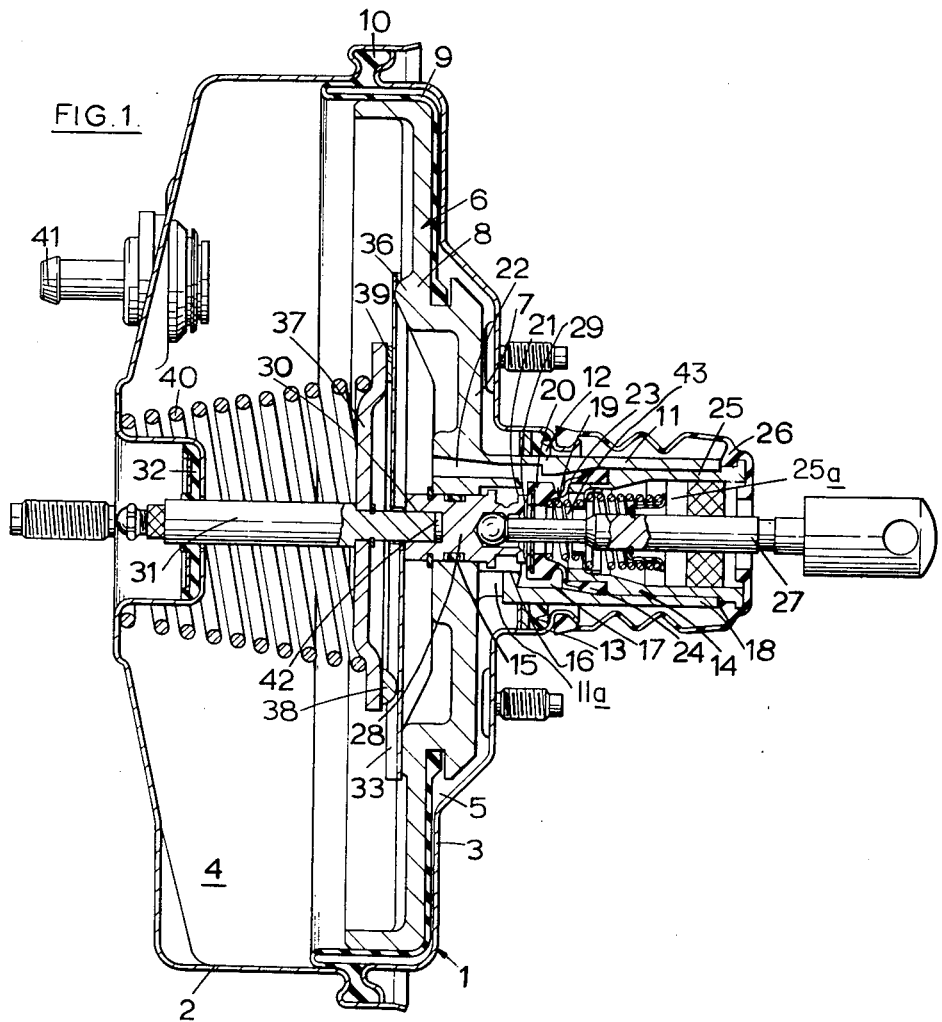
FIG. 1 is a longitudinal section through a fluid-pressure operated servo-motor.
Figure 2:
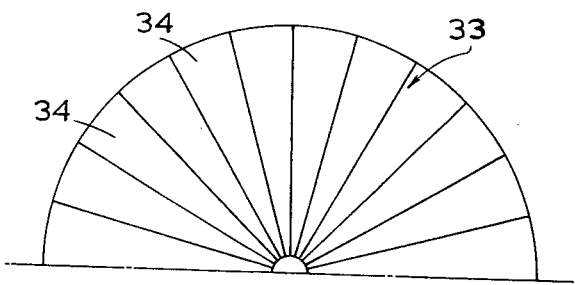
FIG. 2 is a plan of a portion of the reaction means incorporated in the servo-motor of FIG. 1.
Figure 3:
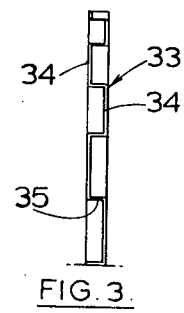
FIG. 3 is an end view of the reaction means.

In the servo-motor illustrated in FIGS. 1 to 3 of the drawings a housing 1 constituted by complementary metal pressings 2 and 3 is divided into a forward constant pressure chamber 4 and rear variable pressure chamber 5 by means of a movable wall 6. The movable wall 6 comprises a rigid one-piece servo-piston 7 of stepped outline of which the portion 8 which is of greater diameter is spaced from the housing 1 and is sealingly connected thereto by means of a rolling diaphragm 9 of which a bead or thickening 10 at its outer peripheral edge is clamped between complementary parts of the metal pressings 2 and 3 to form a seal. A rearwardly directed portion 11 of the piston 7 which is of smaller diameter works through a seal 12 in a rearwardly directed central hub portion 13 of the pressing 3.

The portion 11 of the piston 7 is provided with a longitudinally extending through bore 14 of stepped outline having four bore portions 15 to 18 of progressively increased diameter disposed towards the free end of the portion 11.

A valve assembly 19 for controlling operation of the servo-motor is housed within the bore 14. As illustrated the valve assembly 19 comprises an annular valve member 20 for engagement with a seating 21 defined by a shoulder between the bore portion 16 and 17 to control communication between the chamber 5 and the bore 15 through an axial passage 22 through the piston 7. The valve member 20 is integrally carried by a flexible annular web 23 terminating in a bead 24 which is clamped between the bore portions 17 and 18 by means of a flanged sleeve 25 housed in the bore portion 18. The sleeve 25 is connected to the free end of the hub portion 13 by a flexible boot 26.

An input member 27 comprising a rod extends through the sleeve 25 and at its inner end acts on a valve spool 28 working in the bore portion 15. The outer end of the spool 28 defines a valve seating 29 for engagement with the head 20 and the opposite end projects from the servo-piston 8 and is provided with an axial recess 30 in which is received the inner end of an output member 31 comprising a rod working through a seal 32 in the closed end of the pressing 2.

Reaction means comprising a one-piece annular plate 33 in the form of a metal pressing is disposed between the movable wall 8, the input member 27, and the output member 31. As illustrated the plate 33 is of relatively thin corrugated outline comprising alternate spaced parallel fingers 34 of segmental outline interconnected by radially arranged axially extending webs 35. Thus adjacent depressions are defined between pairs of adjacent webs 35.

The piston 8 is provided at its forward face on a pitch circle of constant diameter with a plurality of angularly spaced semi-cylindrically shaped forwardly directed projections 36 which are received in adjacent depressions in the plate 33 adjacent to its peripheral edge with the projections 36 being of a greater axial length than the webs so that they engage with the fingers 34 at the base of the depressions. The fingers 34 disposed on the side of the plate 33 adjacent to the piston 8 engage at the inner peripheral edge of the plate 33 with the inner end of the spool 28. The output member 31 is provided with and in rigid connection therewith, an annular abutment plate 37 of substantial diameter provided on its face adjacent to the piston 8 with a series of angularly spaced semi-cylindrically shaped rearwardly directed projections 38 which correspond in number to the projections 36. Conveniently the projections 38 are embodied in a ring 39 of synthetic plastics material which is in abutment with the rear face of the abutment plate 37.

In the inoperative position illustrated in the drawings, the head 20 is held away from the seating 21 by the engagement with the head of the spool 28 which is urged rearwardly by a compression return spring 40 acting through the abutment plate 37 and the reaction plate 33, and the reaction plate 33 tends to pivot about the projection 36 as a fulcrum. In this position the chambers 3 and 4 are in communication through the passage 22 and are thus both exposed to the same pressure, for example vacuum, through a connection 41 in the front wall of the pressing 2. The passage 22 is sealed from atmosphere by the engagement of the spool 28 with the head 20, and there is a clearance 42 between the inner end of the output member 31 and the base of the recess 30.

In operation, movement of the rod 27 in an inward direction in response to a pedal load moves the spool 28 in a corresponding direction relative to the output member 31 because of the clearance 42. Initial movement of the spool is accompanied by the head 20 under the influence of a compression spring 43 acting between an abutment on the sleeve and the web 23 until the head 20 engages with the seating 21 to isolate the chambers 5 and 4 by cutting off communication through the passage 22. Further movement of the input member 27 urges the spool 28 away from the head 20 so that air is admitted to the variable pressure chamber 5 to energise the servo-motor through an annular passage 25a in the sleeve 25 surrounding the rod 27 and through the centre of the valve member 20, and a radial passage 11a in the wall of the piston 11.

Before energisation is attained, forward movement of the spool 28 transmits a force to the output member 31 through the fingers, which may cause the plate 33 to flex slightly.

When energisation takes place the movable wall 7 applies a thrust to the output member 31 through the fingers 34 which, in turn, react against the spool 28 to provide a reaction or "feel" transmitted to the foot through the rod 27. During this operation the fingers 34 may flex so that the plate 33 distorts or cones.

The magnitude of the reaction or "feel" comprising the proportion of the output force which is transmitted back to the input member 27 is determined by the relative radial distances between the spool 28, the fulcrum 39, and the fulcrum defined by the projections 36. Clearly the distance between the spool 28 and the fulcrum 39 will always be greater than the distance between the fulcrums 39 and 36.

The number of fingers 34 and the depth of the webs 35 is chosen to provide in a single component normally the plate 33 sufficient flexibility while at the same time maintaining adequate rigidity to enable the servo piston to transmit the servo force to the output member against the force in the return spring 40.

In a modification the servo-motor may be energised by the difference between atmospheric air and air at high pressure.

The output member 31 is adapted to operate an hydraulic master cylinder for a vehicle hydraulic braking system, and the body of the mater cylinder may be received at one end in a recess in the pressing 2.

In the servo-motor illustrated in FIG. 4 of the accompanying drawings the piston 7 comprises rearwardly directed hub portion 45 working through the seal 12 and provided at its inner end with a radial flange 46 including a threaded counterbored recess 47. A first metal pressing 48 of annular dished outline provides a support for the diaphragm 9 and at its inner peripheral edge serves to clamp a bead or thickening 49 at the inner peripheral edge of the diaphragm in a radial groove in the flange 46. The first metal pressing 48 is retained in position by means of a second metal pressing 50 of open dished outline comprising co-axial skirt portion 51 and 52 of smaller and greater diameter which are interconnected by an integral radial flange 53. The skirt portion 52 engages with a complementary portion of the first pressing 48, and the skirt portion 51 is threaded and is screwed into the recess 47. The flange 53 is provided adjacent to the skirt 52 with a continuous annular raised rib or projection 54 comprising a fulcrum support for the outer ends of the adjacent faces of the adjacent fingers 34 on the plate 33 of which the inner ends engage with the free end of the spool 28.

The abutment plate 37 is provided with a single rearwardly directed projection 55 engaging with the adjacent face of a relatively inner fingers 34 of which the opposite face engages with the finger 34.

The return spring 40 abuts at its inner end against the adjacent fingers 34 on the plate 33 which we connected by the webs 35 to the fingers with opposite sides at which the projections 54 and 55 engage. This has the advantage that the resulting pre-load in the plate 33 helps to eliminate any errors which may be present in the plate 33, for example which may have been caused by slight buckling of the plate 33 as it was removed from a press during manufacture.

The construction and operation of the servo-motor illustrated in FIG. 2 of the accompanying drawings is otherwise the same as that of FIGS. 1 to 3 and corresponding reference numerals have been applied to corresponding parts.

The reaction plate 33 embodied in each servo-motor described above is of a size suitable for use in a range of servo-motors. The plate is constructed to permit conical distortion at a very low force, whilst possessing sufficient strength by virtue of the webs 35 to resist the forces tendency to bend the fingers 34.

I claim:

1. A fluid-pressure operated servo-motor comprising a housing an input member, an output member, a movable wall dividing said housing into separate chambers and through which said input member acts on said output member, valve means responsive to an input force applied to said input member for controlling the generation of differential pressure to opposite sides of said movable wall to produce an output force which is adapted to be transmitted to said output member through said wall, and reaction means for transmitting back to said input member a reactive proportion of said output force to provide a reaction whereby operation of the servo-motor can be more readily controlled, wherein said reaction means comprises a single component in the form of a one-piece annular reaction plate of corrugated outline which, in use, is adapted to flex to transmit a load from said movable wall to said output member and to transmit a reactive proportion of said output force back to said input member, wherein said annular reaction plate comprises angularly spaced fingers of segmental outline having inner and outer ends of which alternate fingers are located in a corresponding one of two spaced parallel planes, and radial webs substantially normal to said fingers and extending between said planes integrally interconnect adjacent fingers and said movable wall includes an axially movable piston of substantial diameter, and a face of said piston adjacent to said output member is provided with abutment means which defines a fulcrum for said outer end of said fingers and said output member is provided with abutment means defining a fulcrum with said plate at an intermediate point in the radial length of said plate, and wherein said piston comprises a hub member guided in said housing for sliding movement and having an inner end, a radial flange at said inner end of said hub member provided with a recess, and a first metal pressing retained in said recess accommodates said annular reaction plate, and a second metal pressing clamped against said hub member by said first metal pressing to retain in a groove in said hub member, a tickening or bead at the peripherally innermost end of a flexible diaphragm which is supported by said second pressing and which is sealingly connected to said housing at its outermost peripheral edge, and projection means provided in said first pressing defining said abutment means.

* * * * *